(12) United States Patent
Hayashi et al.

(10) Patent No.: US 11,937,024 B2
(45) Date of Patent: Mar. 19, 2024

(54) PROJECTION SYSTEM, PROJECTION DEVICE AND PROJECTION METHOD

(71) Applicant: Panasonic Intellectual Property Management Co., Ltd., Osaka (JP)

(72) Inventors: Yuki Hayashi, Osaka (JP); Tetsuya Nishi, Osaka (JP); Keisuke Hara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

(21) Appl. No.: 17/598,806

(22) PCT Filed: Jan. 23, 2020

(86) PCT No.: PCT/JP2020/002235
§ 371 (c)(1),
(2) Date: Sep. 27, 2021

(87) PCT Pub. No.: WO2020/202720
PCT Pub. Date: Oct. 8, 2020

(65) Prior Publication Data
US 2022/0201259 A1 Jun. 23, 2022

(30) Foreign Application Priority Data
Mar. 29, 2019 (JP) ................. 2019-067625

(51) Int. Cl.
*G03B 21/14* (2006.01)
*H04N 9/31* (2006.01)
(52) U.S. Cl.
CPC ......... *H04N 9/3129* (2013.01); *H04N 9/3161* (2013.01)

(58) Field of Classification Search
CPC .... G03B 21/145; G03B 21/14; H04N 9/3194; H04N 9/3185; B25H 7/00; B23Q 17/2414
See application file for complete search history.

(56) References Cited

U.S. PATENT DOCUMENTS

| 2002/0105623 A1 | 8/2002 | Pinhanez |
| 2014/0160115 A1 | 6/2014 | Keitler et al. |

(Continued)

FOREIGN PATENT DOCUMENTS

| EP | 3226029 A1 | 10/2017 |
| JP | H11-278364 A | 10/1999 |

(Continued)

OTHER PUBLICATIONS

Extended European Search Report dated Mar. 25, 2022 issued in the corresponding European Patent Application No. 20782525.8.

(Continued)

*Primary Examiner* — Ryan D Howard
(74) *Attorney, Agent, or Firm* — Rimon P.C.

(57) ABSTRACT

A projection system includes a projection device that projects drawings individually onto a plurality of work spots in a work site. The projection device includes a driver that changes an orientation of the projection device. When drawings are individually projected onto a first work spot and a second work spot in a stated sequence, and the second work spot is outside a projection angle that is projectable by the projection device, the driver changes the orientation of the projection device to include the second work spot within the projection angle after work at the first work spot is finished. The first work spot and the second work spot are included in the plurality of work spots.

17 Claims, 10 Drawing Sheets

(56) References Cited

U.S. PATENT DOCUMENTS

| | | | |
|---|---|---|---|
| 2015/0334362 A1* | 11/2015 | Kahle | G03B 17/54 |
| | | | 348/136 |
| 2016/0057400 A1 | 2/2016 | Winter et al. | |
| 2017/0264871 A1 | 9/2017 | Fujiune | |
| 2018/0027218 A1 | 1/2018 | Kiso et al. | |
| 2018/0336732 A1 | 11/2018 | Schuster | |
| 2018/0374026 A1 | 12/2018 | Osawa et al. | |

FOREIGN PATENT DOCUMENTS

| | | | |
|---|---|---|---|
| JP | 2001-259943 A | 9/2001 | |
| JP | 2005-275327 A | 10/2005 | |
| JP | 2006-214922 A | 8/2006 | |
| JP | 2008-224516 A | 9/2008 | |
| JP | 2013-103291 A | 5/2013 | |
| JP | 2016-117581 A | 6/2016 | |
| JP | 2016-522905 A | 8/2016 | |
| JP | 2017-163431 A | 9/2017 | |
| KR | 10-2016-0123888 A | 10/2016 | |
| WO | 2017/119127 A1 | 7/2017 | |

OTHER PUBLICATIONS

International Search Report and Written Opinion dated Mar. 31, 2020 in International Patent Application No. PCT/JP2020/002235; with partial English translation.
Chinese Office Action and Search Report dated Aug. 3, 2023 issued in the corresponding Chinese Patent Application No. 202080023916. 2, with English translation of the Search Report.

* cited by examiner

FIG. 6

| Sequence of work | Work spot | Corresponding drawing |
|---|---|---|
| 1 | Work spot 101 | Drawing A |
| 2 | Work spot 102 | Drawing B |
| 3 | Work spot 106 | Drawing F |
| 4 | Work spot 105 | Drawing E |
| 5 | Work spot 104 | Drawing D |
| 6 | Work spot 103 | Drawing C |
| ⋮ | ⋮ | ⋮ |

PROJECTION SYSTEM, PROJECTION DEVICE AND PROJECTION METHOD

CROSS-REFERENCE OF RELATED APPLICATIONS

This application is the U.S. National Phase under 35 U.S.C. § 371 of International Patent Application No. PCT/JP2020/002235, filed on Jan. 23, 2020, which in turn claims the benefit of Japanese Application No. 2019-067625, filed on Mar. 29, 2019, the entire disclosures of which Applications are incorporated by reference herein.

TECHNICAL FIELD

The present invention relates to a projection system, a projection device, and a projection method.

BACKGROUND ART

Conventional projection devices that can project images onto screens, for example, have been known. As a technique related to such projection devices, Patent Literature (PTL) 1 discloses a method for displaying objects of a design plan on a boundary surface of a room.

CITATION LIST

Patent Literature

[PTL 1] Japanese Unexamined Patent Application Publication (Translation of PCT Application) No. 2016-522905

SUMMARY OF INVENTION

Technical Problem

However, with the aforementioned conventional technique, work cannot be performed efficiently when there are many work spots.

In view of the above, the present invention aims to provide a projection system, a projection device, and a projection method that allow workers to perform their work efficiently, and makes it possible to shorten a construction period and reduce burdens on the workers.

Solution to Problem

In order to achieve the above, a projection system according to one aspect of the present invention includes: a projection device that projects drawings individually onto a plurality of work spots in a work site. The projection device includes a driver that changes an orientation of the projection device. When drawings are individually projected onto a first work spot and a second work spot in a stated sequence, and the second work spot is outside a projection angle that is projectable by the projection device, the driver changes the orientation of the projection device to include the second work spot within the projection angle after work at the first work spot is finished, the first work spot and the second work spot being included in the plurality of work spots.

Moreover, a projection device according to one aspect of the present invention is a projection device that projects drawings individually onto a plurality of work spots in a work site. The projection device includes: a driver that changes an orientation of the projection device. When drawings are individually projected onto a first work spot and a second work spot in a stated sequence, and the second work spot is outside a projection angle that is projectable by the projection device, the driver changes the orientation of the projection device to include the second work spot within the projection angle after work at the first work spot is finished, the first work spot and the second work spot being included in the plurality of work spots.

Moreover, a projection method according to one aspect of the present invention includes: projecting drawings individually onto a plurality of work spots in a work site by a projection device including a driver that changes an orientation of the projection device. When drawings are individually projected onto a first work spot and a second work spot in a stated sequence, and the second work spot is outside a projection angle that is projectable by the projection device, the projecting includes changing the orientation of the projection device by the driver to include the second work spot within the projection angle after work at the first work spot is finished, the first work spot and the second work spot being included in the plurality of work spots.

Moreover, one aspect of the present invention can be achieved as a program that causes a computer to execute the above projection method. Alternatively, one aspect of the present invention can be achieved as a non-transitory computer-readable recording medium having the program recorded thereon.

Advantageous Effects of Invention

The projection device and so on according to the present invention can allow workers to perform their work efficiently, and makes it possible to shorten a construction period and reduce burdens on the workers.

BRIEF DESCRIPTION OF DRAWINGS

FIG. 6 is a table showing an example of sequence information showing a sequence of work input to the projection system according to the embodiment.

DESCRIPTION OF EMBODIMENTS

Hereinafter, a projection system, a projection device, and a projection method according to an embodiment of the present invention will be described with reference to the drawings. Note that the embodiment described below shows a specific example of the present invention. Therefore, the numerical values, shapes, materials, structural components, the arrangement and connection of the structural components, steps and the order of the steps, or the like mentioned in the following embodiment are mere examples and not intended to limit the present invention. Therefore, among the structural components in the following embodiment, structural components not recited in any one of the independent claims representing broadest concepts of the present invention are described as optional structural components.

In addition, each diagram is a schematic diagram and is not necessarily a precise illustration. Therefore, for example, the scales etc. of the drawings are not necessarily precise. Moreover, throughout the figures, structural components that are essentially the same share like reference signs, and duplicate description is omitted or simplified.

Embodiment

[Overview]

Figure 1:
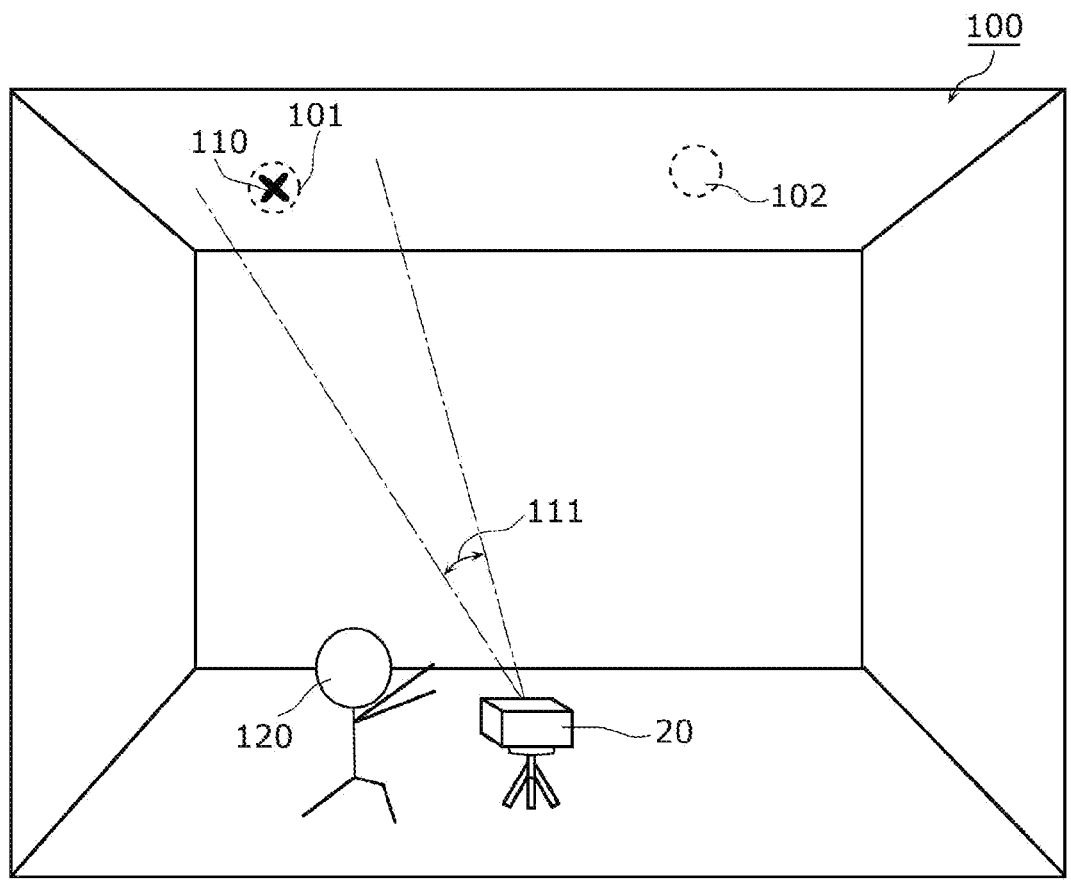
FIG. 1 is a diagram for illustrating an overview of a projection system according to an embodiment.
Figure 2:
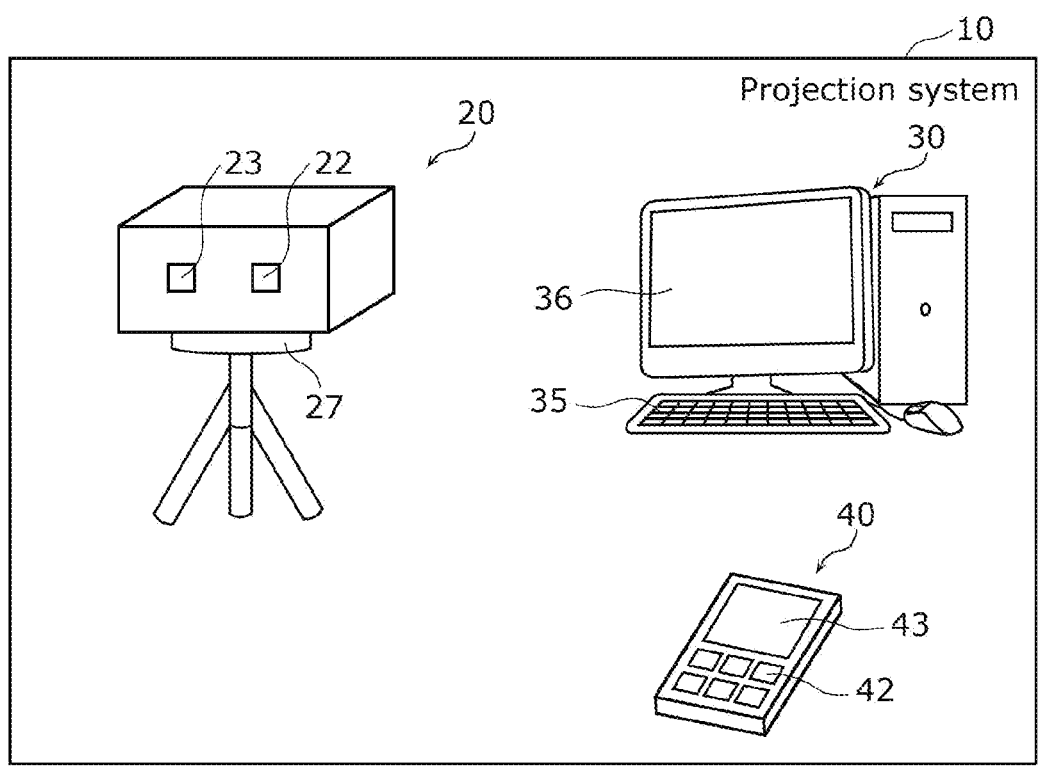
FIG. 2 is an external view of devices included in the projection system according to the embodiment.

An overview of a projection system according to an embodiment will be described with reference to FIG. 1 and FIG. 2. FIG. 1 is a diagram for illustrating the overview of the projection system according to the present embodiment. FIG. 2 is an external view of devices included in the projection system according to the present embodiment.

Projection system 10 according to the present embodiment includes projection device 20. As illustrated in FIG. 1, projection device 20 is placed in work site 100 in a building under construction. Projection device 20 projects drawings 110 onto a structure that is included in work site 100. Specifically, this structure may be a floor, a wall, a pillar, or a ceiling, for example. Drawing 110 is, for example, a drawing to be projected onto work spot 101 in work site 100. Worker 120 can perform work easily and precisely by following drawing 110.

Examples of the work include marking. For example, drawing 110 to be projected with a length specified in a design is a line or a shape of light projected at a position where worker 120 should mark. Worker 120 can easily draw a marking line by simply tracing the line or shape of light shown in drawing 110. Note that, such a line or shape of light need not necessarily be used as a guide for drawing a marking line. A line or shape of light itself may be used as a marking line. Moreover, the work need not be marking. The work may be drilling, and may be any other work without limitation.

There are multiple work spots at which worker 120 should perform work in work site 100. For example, as illustrated in FIG. 1, there are two work spots 101 and 102 in work site 100. Worker 120 is to perform work at work spot 101 and work spot 102 in stated sequence.

Projection device 20 projects drawing 110 onto work spot 101. At this time, the next work spot 102 is not included within projection angle 111 of projection device 20. In projection system 10 according to the present embodiment, the orientation of projection device 20 is automatically changed after the work at work spot 101 has finished and then drawing 110 is projected onto work spot 102. This allows worker 120 to work efficiently.

[Configuration of System]

Figure 3:
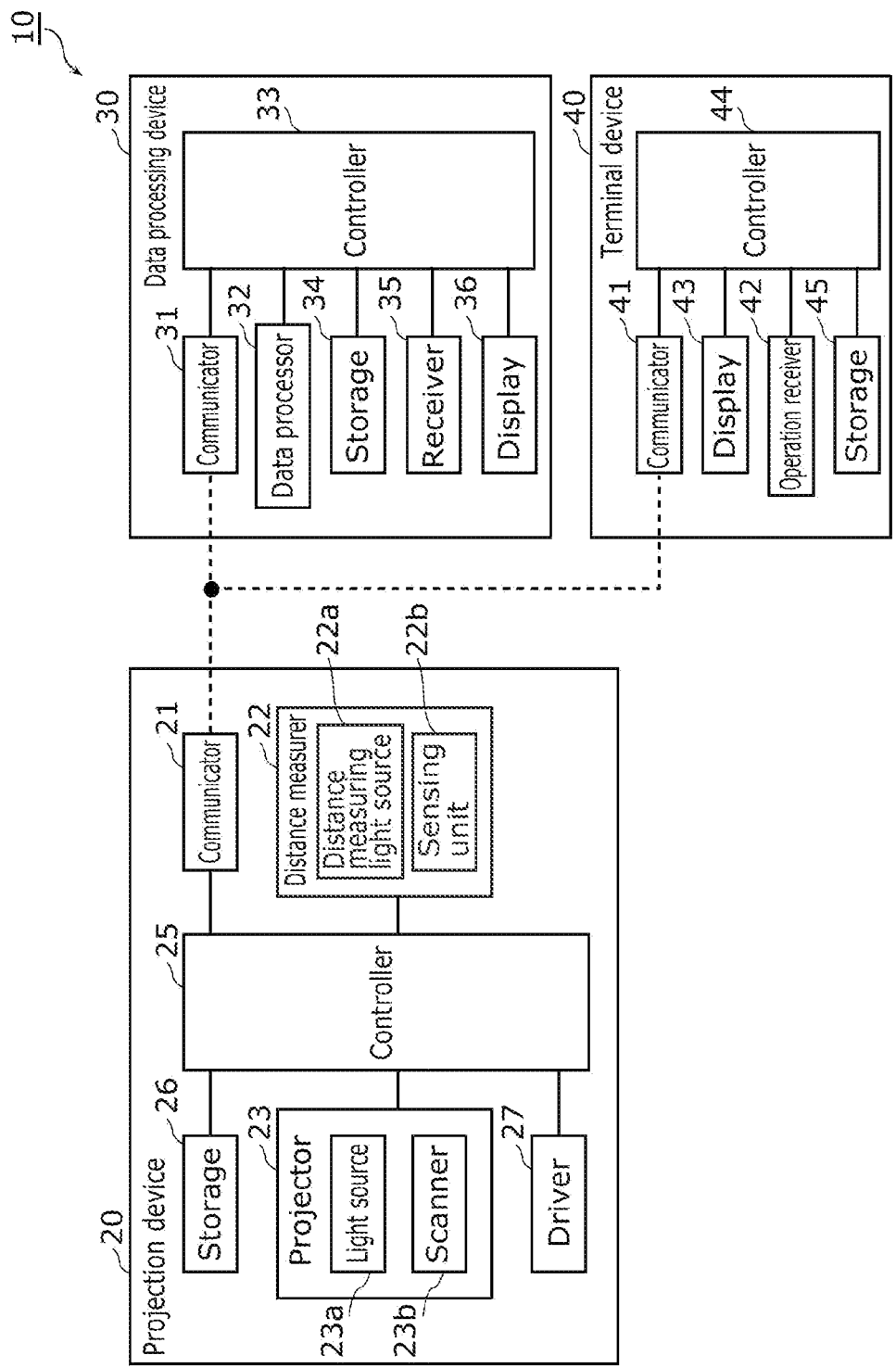
FIG. 3 is a block diagram of a function configuration of the projection system according to the embodiment.

Next, a specific functional configuration of projection system 10 according to the present embodiment will be described with reference to FIG. 2 and FIG. 3. FIG. 3 is a block diagram of the functional configuration of the projection system according to the present embodiment.

[Projection Device]

Projection device 20 is mounted on a tripod and placed on the floor of work site 100, as illustrated in FIG. 1 and FIG. 2, for example. Alternatively, projection device 20 may be placed on a wall or the ceiling of work site 100. As illustrated in FIG. 3, projection device 20 includes communicator 21, distance measurer 22, projector 23, controller 25, storage 26, and driver 27.

Communicator 21 is a communication interface that allows projection device 20 to communicate with data processing device 30 and terminal device 40. Communicator 21 communicates wirelessly with each of data processing device 30 and terminal device 40, but may also communicate with those devices through wired communication. The standard of the communication to be performed by communicator 21 may be any standard without limitation.

Distance measurer 22 is an example of a detector and measures a distance from projection device 20 to a structure that is included in work site 100. Distance measurer 22 is a range image sensor, such as a time of flight (TOF) sensor, for example. The range image sensor produces a distance image as a result of distance measurement. Each of the pixel values of pixels that constitute the distance image indicates a distance from distance measurer 22. Note that distance measurer 22 may be any other distance measuring sensors. For example, distance measurer 22 may be a distance measuring sensor using a phase difference detection method, or a distance measuring sensor using a triangulation method. As illustrated in FIG. 3, distance measurer 22 includes distance measuring light source 22a and sensing unit 22b.

Distance measuring light source 22a is a light source that emits light to a structure. Distance measuring light source 22a is a light-emitting element that emits infrared light, for example. Alternatively, distance measuring light source 22a may be a light-emitting element that emits visible light. Note that distance measuring light source 22a need not be a different light source from light source 23a included in projector 23. Light source 23a included in projector 23 may be used as distance measuring light source 22a. In other words, distance measurer 22 need not have distance measuring light source 22a, and may be a sensor including only sensing unit 22b.

Sensing unit 22b is a light receiving element that detects reflected light, which is light emitted by distance measuring light source 22a and reflected off the structure. Sensing unit 22b is an image sensor including a photodiode array, for example.

Projector 23 is a projection module for projecting drawing 110 onto a projection plane. Projector 23 includes light source 23a and scanner 23b. Although not illustrated, projector 23 may include optical components, such as a lens and a mirror.

Light source 23a is a semiconductor laser element that emits visible light, for example. Alternatively, light source 23a may be a light emitting diode (LED). Light source 23a may have a configuration that makes it possible to change the emission color. For example, light source 23a may include multiple light-emitting elements that emit light in different colors. Examples of the light emitting elements include blue light emitting element, green light emitting element, and red light emitting element.

Scanner 23b scans the light emitted by light source 23a on a structure. Scanner 23b is a microelectromechanical systems (MEMS) mirror or a Galvano scanner, for example.

In the present embodiment, projector 23 projects a target drawing, which is a drawing to be projected onto a target spot. This target spot is a work spot determined by data processing device 30 among work spots 101 and 102. For example, in the example illustrated in FIG. 1, projector 23 projects drawing 110 onto work spot 101.

Moreover, there is a limit to projection angle 111 that can be projected by projector 23. For example, when projection device 20 is placed on a horizontal plane, projection angle 111 that can be projected is in the range of approximately 40° in the horizontal direction and approximately 20° in the vertical direction. Therefore, in the example shown in FIG. 1, drawing 110 can be projected onto work spot 101, but drawing 110 cannot be projected onto work spot 102. In order to project drawing 110 onto work spot 102, it is necessary to change the orientation of projection device 20 automatically. In the present embodiment, the direction and the range that can be projected by projector 23 are changed by changing the orientation of projection device 20 by driver 27.

Controller 25 is a control device that controls distance measurer 22, projector 23, and driver 27 to project drawing 110 onto a projection plane. For example, controller 25 is achieved by large scale integration (LSI), which is an integrated circuit (IC). Such an integrated circuit is not limited to LSI, and may be achieved by a dedicated circuit or a general-purpose processor. For example, controller 25 may be achieved by a microcomputer. Furthermore, controller 25 may be a field programmable gate array (FPGA), or a reconfigurable processor capable of reconfiguring the connections and settings of circuit cells inside LSI.

Storage 26 is a recording device that stores a control program for projecting drawing 110. This control program is to be executed by controller 25. For example, storage 26 is non-volatile memory and is achieved by semiconductor memory.

Driver 27 is a drive mechanism for changing the orientation of projection device 20. Driver 27 changes the projectable direction by changing the orientation of projection device 20. For example, driver 27 can change the orientation of projection device 20 in directions of pan (horizontal direction), tilt (vertical direction) and roll (rotational direction). Driver 27 is achieved, for example, by a stepping motor.

In the present embodiment, a sequence of projection of drawings is determined for a plurality of work spots. For example, in the example shown in FIG. 1, it is assumed that drawings are projected onto work spot 101 (a first work spot) and work spot 102 (a second work spot) in a stated sequence. In this case, when work spot 102 is outside projection angle 111 that can be projected by projection device 20, driver 27 changes the orientation of projection device 20 to include work spot 102 within projection angle 111 after the work at work spot 101 is finished. Accordingly, the orientation of projection device 20 is changed automatically without worker 120 changing the orientation of projection device 20, and drawing 110 is projected onto the next work spot 102.

For example, the end of work is determined by controller 25 based on a signal transmitted from terminal device 40 operated by worker 120. Alternatively, controller 25 may determine the end of work based on images captured by a camera, which is not illustrated. This camera captures images of how worker 120 performs the work or a result of the work at work spot 101. Note that, when sensing unit 22b produces a visible light image, controller 25 may use a detection result of sensing unit 22b instead of images captured by the camera.

Driver 27 is controlled by controller 25. Controller 25 determines a direction and amount of movement of the orientation of projection device 20 to include work spot 102 within projection angle 111, based on a current orientation of projection device 20 and the position of the next work spot 102. Controller 25 controls driver 27 with the determined direction and amount of movement, so that driver 27 changes the orientation of projection device 20. Note that, when there are one or more work spots at which work is to be performed after work spot 102, controller 25 may determine the direction and amount of movement so that work spot 102 and a plurality of work spots including one or more consecutive work spots from work spot 102 in the sequence of the work are within projection angle 111. This makes it possible to set projection angle 111 such that the work spots are within projection angle 111 by changing the orientation once, and thus the frequency of changing the orientation can be reduced.

[Data Processing Device]

Next, data processing device 30 will be described. Data processing device 30 is an information processing device that allows a user to input a sequence of work by generating and displaying an image for input. Data processing device 30 determines work spots onto which drawings are to be projected and target drawings to be projected onto the work spots in accordance with the sequence of work input by the user. Data processing device 30 is, for example, a computer device. As illustrated in FIG. 3, data processing device 30 includes communicator 31, data processor 32, controller 33, storage 34, receiver 35, and display 36.

Communicator 31 is a communication interface that allows data processing device 30 to communicate with projection device 20 and terminal device 40. Communicator 31 communicates wirelessly with projection device 20 and terminal device 40, but may also communicate with those devices through wired communication. The standard of the communication to be performed by communicator 31 may be any standard without limitation.

Based on design data, data processor 32 generates an image for input for allowing a user to input the sequence of work for the work spots and causes display 36 to display the image for input. Data processor 32 is, for example, a microcomputer or a processor. Moreover, based on the sequence of work that has been input, data processor 32 determines the sequence of the work spots onto which drawings are to be projected, and the drawings to be projected in accordance with the determined sequence. Data processor 32 transmits sequence information indicating the determined sequence and the drawings to be individually projected onto the work spots to controller 25 of projection device 20 via communicator 31 and communicator 21.

The design data is data that shows work spots. Specifically, the design data is three-dimensional data showing the size and shape of work site 100. For example, the design data is 3D computer-aided design (CAD) data. The design data includes two-dimensional data showing a layout of work site 100 and two-dimensional data showing work spots. In the design data, each of the work spots is associated with a corresponding drawing to be projected. When a work spot is determined as a target spot, a target drawing to be projected onto the target spot is determined by referring to the design data.

For example, data processor 32 associates the design data with an actual work site 100. Such an actual work site 100 is shown, for example, by spatial data obtained by measuring distances to surrounding structures after projection device 20 is placed in work site 100. Such association specifies the placing position and orientation of projection device 20 in the design data. Note that a user, such as worker 120 or a manager of the work, may input a position in the design data of the placed projection device 20. In other words, the distances of work site 100 need not be measured.

Controller 33 is a control device that controls communicator 31, data processor 32, storage 34, receiver 35, and display 36 to generate an image for input and determine drawings and the sequence of work spots. For example, controller 33 is achieved by LSI, which is an integrated circuit. Such an integrated circuit is not limited to LSI, and may be achieved by a dedicated circuit or a general-purpose processor. For example, controller 33 may be achieved by a microcomputer. Furthermore, controller 33 may be an FPGA or a reconfigurable processor capable of reconfiguring connection and settings of circuit cells inside LSI.

Storage 34 is a recording device that stores a control program for generating an image for input and determining drawings and the sequence of work spots. The control program is to be executed by data processor 32 and controller 33. For example, storage 34 is non-volatile memory and is achieved by semiconductor memory. Storage 34 also stores the design data and drawing data indicating drawings to be projected.

Receiver 35 is an example of a first receiver that receives input of a sequence of work. Receiver 35 receives input of a sequence of work from worker 120 or a manager of the work, for example. For example, receiver 35 is an input device, such as a keyboard or a mouse, or may be a touch sensor or a physical button.

Display 36 displays an image for input for allowing a user to input the sequence of work. Display 36 is, for example, a liquid crystal display panel or an organic electroluminescence (EL) display panel.

[Terminal Device]

Next, terminal device 40 will be described. Terminal device 40 also functions as a remote controller that allows worker 120 to remotely control projection device 20. For example, terminal device is a dedicated remote controller for projection device 20. Alternatively, terminal device 40 may be a mobile terminal, such as a smartphone or a tablet device on which a dedicated application program is installed. As illustrated in FIG. 3, projection device 40 includes communicator 41, operation receiver 42, display 43, controller 44, and storage 45.

Communicator 41 is a communication interface that allows terminal device 40 to communicate with projection device 20 and data processing device 30. Communicator 41 communicates wirelessly with projection device 20 and data processing device 30, but may also communicate with those devices through wired communication. The standard of the communication to be performed by communicator 41 may be any standard without limitation.

Operation receiver 42 is a user interface device that receives an operation of worker 120. For example, operation receiver 42 is achieved by one or more physical buttons, or may be a touch panel, or the like.

Display 43 displays an image showing an operating status of projection device 20, for example. Display 43 is, for example, a liquid crystal display panel or an organic EL display panel.

Controller 44 is a control device that controls communicator 41, operation receiver 42, display 43, and storage 45. Controller 44 is achieved by LSI, which is an integrated circuit. Such an integrated circuit is not limited to LSI, and may be achieved by a dedicated circuit or a general-purpose processor. For example, controller 44 may be achieved by a microcomputer. Furthermore, controller 44 may be an FPGA, or a reconfigurable processor capable of reconfiguring the connections and settings of circuit cells inside LSI.

Specifically, controller 44 causes communicator 41 to transmit a signal to projection device 20 to operate projection device 20 in response to an operation received by operation receiver 42. For example, when operation receiver 42 receives an operation of an instruction indicating an end of work from worker 120, controller 44 causes communicator 41 to transmit an end signal indicating the end of work to projection device 20.

Storage 45 is a recording device that stores a control program that is to be executed by controller 44. For example, storage 45 is non-volatile memory and is achieved by semiconductor memory. Storage 45 may store unique identification information in terminal device 40.

[Operation]

Next, operations of projection system 10 according to the present embodiment will be described with reference to FIG. 4 to FIG. 7B.

Figure 4:
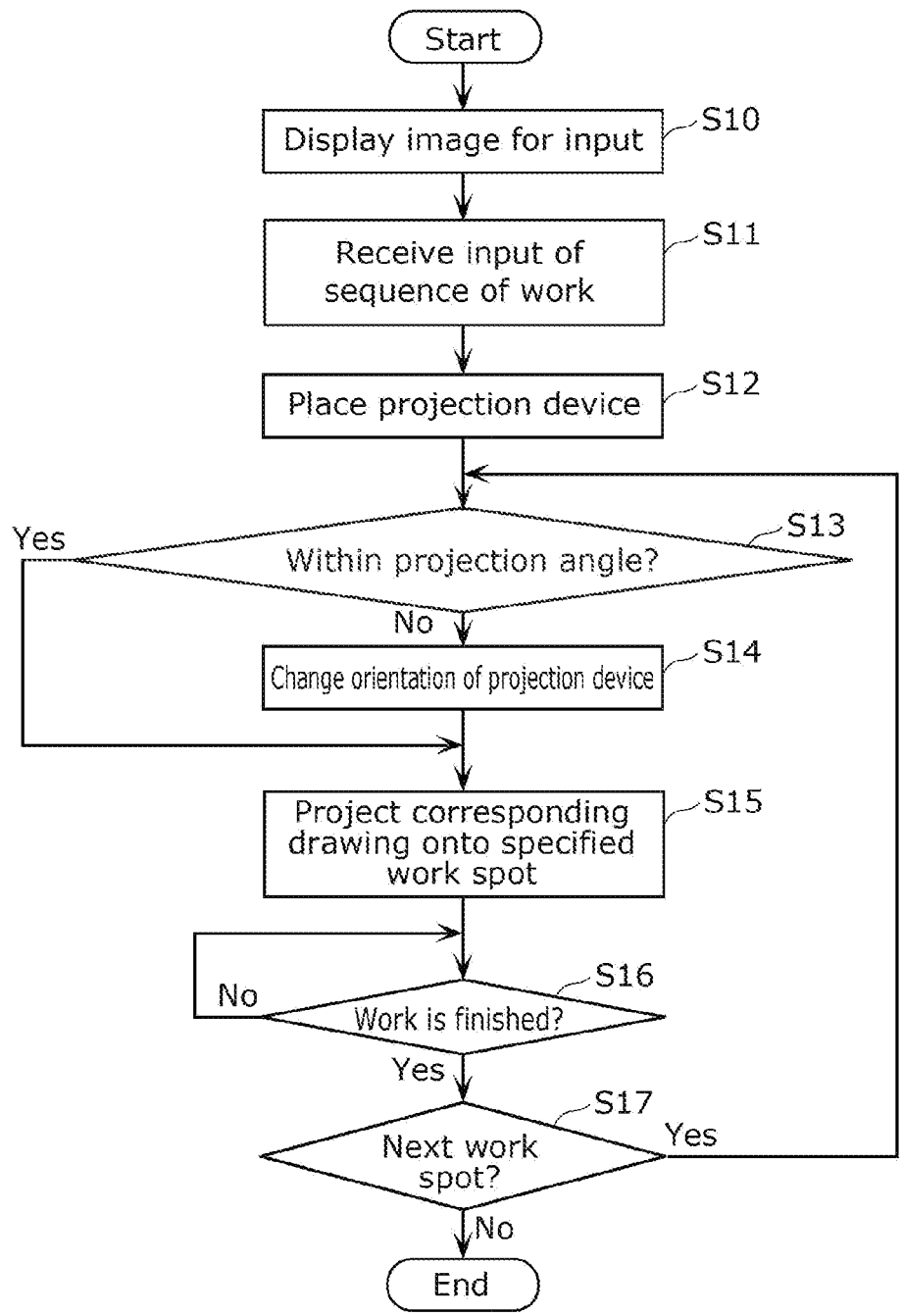
FIG. 4 is a flowchart illustrating operations of the projection system according to the embodiment.

FIG. 4 is a flowchart illustrating operations of projection system 10 according to the present embodiment. As illustrated in FIG. 4, first, in data processing device 30, display 36 displays an image for input (S10). Specifically, data processor 32 generates image for input 130 shown in FIG. 5, based on the design data. Display 36 displays the generated image for input 130. Note that FIG. 5 is a diagram illustrating an example of the image for input for inputting a sequence of work in the projection system according to the embodiment.

Figure 5:
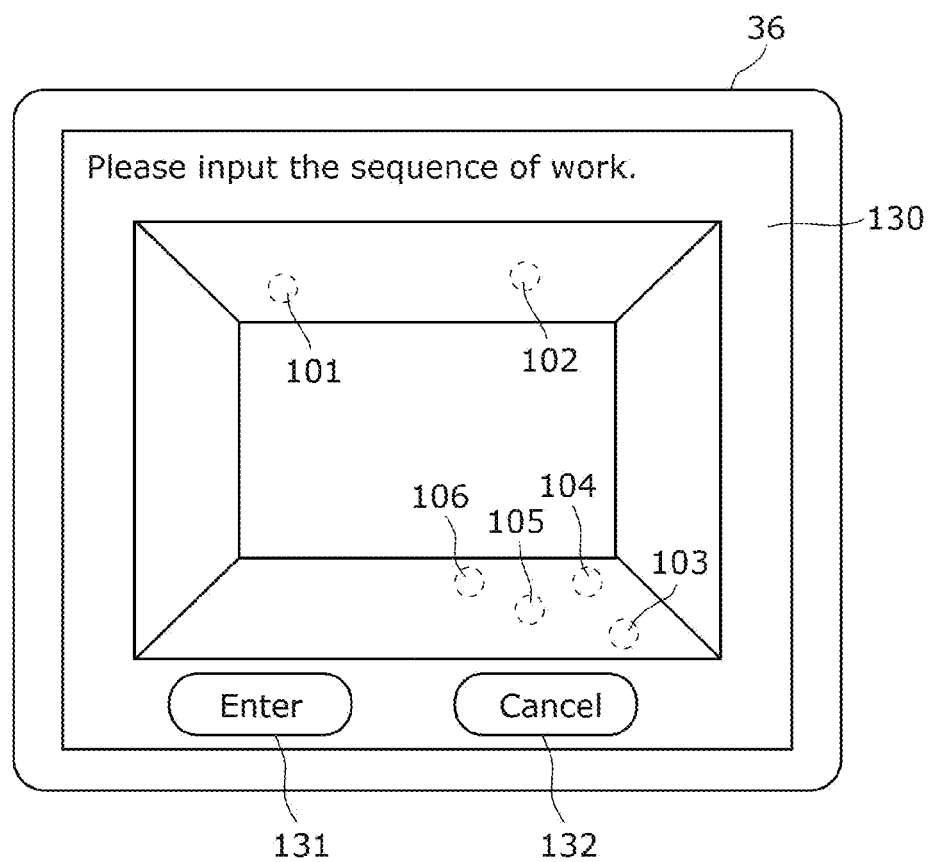
FIG. 5 is a diagram illustrating an example of an image for input for inputting a sequence of work into the projection system according to the embodiment.

As illustrated in FIG. 5, image for input 130 shows work site 100 in two or three dimensions and includes work spots 101 to 106. Work spots 101 to 106 in image for input 130 can be selected sequentially by a user.

After image for input 130 appears on display 36, receiver 35 receives input of a sequence of work as illustrated in FIG. 4 (S11). For example, receiver 35 receives, as a sequence of work, the sequence of work spots 101 to 106 selected by a user.

Note that it is not necessary to select all work spots 101 to 106. For example, if multiple workers 120 share work, only work responsible for one worker 120 may be selected. Image for input 130 includes enter button 131 and cancel button 132. When receiver 35 receives selection of enter button 131, data processor 32 determines, as the sequence of work, the sequence of the work spots selected before enter button 131 is selected. Moreover, when input 35 receives selection of cancel button 132, data processor 32 releases the selected work spots and makes it possible to select work spots again.

FIG. 6 is a table showing an example of sequence information showing a sequence of work input to projection system 10 according to the present embodiment. As shown in FIG. 6, each of work spots 101 to 106 is associated with a corresponding drawing to be projected. Data processor 32 transmits the sequence information shown in FIG. 6 to controller 25 of projection device 20 via communicator 31 and communicator 21.

Next, projection device 20 is placed (S12). For example, worker 120 places projection device 20 on the floor of work site 100. Note that projection device 20 may be placed before an image for input is displayed. After projection device 20 is placed, data processing device 30 associates the actual work site 100 with the design data.

Next, controller 25 determines whether or not a target spot onto which a drawing is to be projected is within projection angle 111 based on the sequence information (S13). If the target spot is not within projection angle 111 (No in S13), controller 25 changes the orientation of projection device 20 by controlling driver 27 (S14). In this way, the target spot is located within projection angle 111 of by projection device 20, making it possible to project drawing 110. If the target spot is within projection angle 111 (Yes in S13), driver 27 maintains the current state without changing the orientation of projection device 20.

Next, projector 23 of projection device 20 projects a corresponding drawing onto the target spot that is a determined work spot (S15). Worker 120 performs work, such as marking, based on drawing 110 that is displayed. After the work is finished, worker 120 provides an instruction indicating the end of work by operating terminal device 40. Drawing 110 is kept being projected onto the work spot until the end of the work is instructed (No in S16). After the end of the work is instructed (Yes in S16), if there is a next work spot (Yes in S17), the process returns to step S13 and controller 25 determines whether or not the next work spot is within projection angle 111. After that, the process of steps S13 to S17 described above will be repeated until the work at all work spots has been finished (No in S17).

Figure 7A:
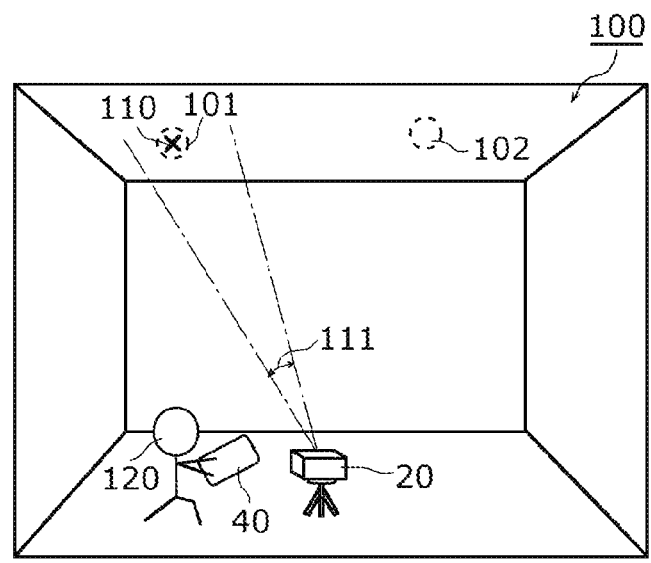
FIG. 7A is a diagram for illustrating a situation before an orientation of a projection device in the projection system according to the embodiment is changed.
Figure 7B:
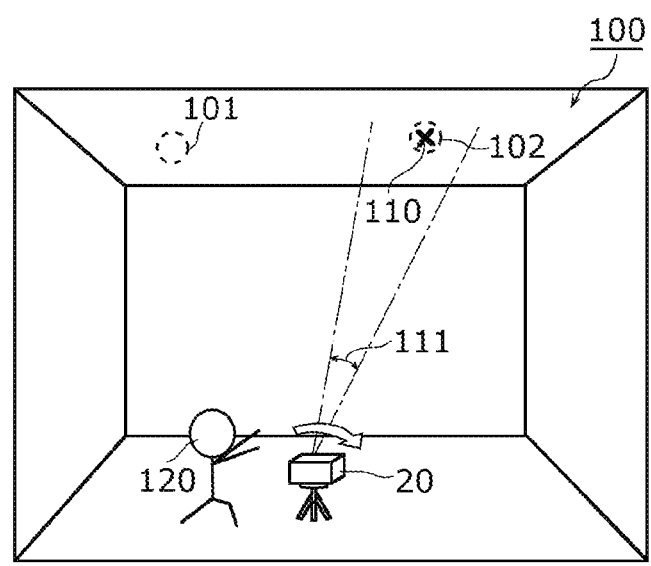
FIG. 7B is a diagram for illustrating a situation after the orientation of the projection device in the projection system according to the embodiment is changed.

FIG. 7A and FIG. 7B are diagrams illustrating a situation in which the orientation of projection device 20 in projection system 10 according to the embodiment is changed. Here, it is assumed that the sequence of work that has been input is in order of work spot 101 and work spot 102.

After work at work spot 101 is finished, worker 120 operates terminal device 40 and performs input to provide an instruction indicating the end of the work at work spot 101. With this, an end signal is transmitted from terminal device 40 to projection device 20 via communicator 41 and communicator 21.

At this time, as illustrated in FIG. 7A, work spot 102 is outside projection angle 111 of projection device 20. Therefore, as illustrated in FIG. 7B, work spot 102 is included within projection angle 111 by changing the orientation of projection device 20 by driver 27. Drawing 110 is then displayed onto work spot 102. This allows worker 120 to perform work at work spot 102.

[Effects, etc.]

As described above, projection system 10 according to the present embodiment includes projection device 20 that projects drawings 110 individually onto a plurality of work spots in work site 100. Projection device 20 includes driver 27 that changes an orientation of projection device 20. When drawings are individually projected onto a first work spot and a second work spot in a stated sequence, and the second work spot is outside projection angle 111 that is projectable by projection device 20, driver 27 changes the orientation of projection device 20 to include the second work spot within projection angle 111 after work at the first work spot is finished, the first work spot and the second work spot being included in the plurality of work spots.

This reduces a burden on worker 120, because worker 120 does not have to change the orientation of projection device 20. Since drawings 110 are projected in sequence, worker 120 only needs to work in accordance with the projected drawing 110 and can skip checking a design drawing. Accordingly, the present embodiment allows worker 120 to work efficiently, and reduces a construction period and burdens on workers.

Moreover, for example, projection system 10 further includes: display 36; data processor 32 that generates, based on design data showing the plurality of work spots, image for input 130 for inputting a sequence of work at the plurality of work spots, and causes display 36 to display image for input 130; and receiver 35 that receives input of the sequence of the work. Projection device 20 projects drawings 110 individually onto the plurality of work spots in accordance with the sequence of the work received by receiver 35.

With this, drawings 110 are projected in accordance with the sequence input by the user. This allows worker 120 to input, as a sequence of work, a sequence that is easy for them to work, thereby improving the work efficiency. The user can input any sequence as the sequence of work. Here, the user can input only a sequence of some of the work spots. Therefore, for example, work spots that are not responsible for worker 120 or that are not yet available for work can be omitted from the sequence of work. This makes it is possible to prevent drawing 110 from being projected onto these work spots.

Moreover, for example, projection system 10 further includes operation receiver 42 that receives an instruction indicating an end of work from worker 120 performs work at the plurality of work spots. Projection device 20 projects one of drawings 110 onto the second work spot after the instruction indicating the end of work at the first work spot is received by operation receiver 42.

This allows drawing 110 to be projected onto a next work spot at a timing desired by worker 120 after the work at the work spot has been finished. Therefore, it is possible to prevent drawing 110 from being projected onto the next work spot, when worker 120 is not ready to perform next work regardless of before or after the end of work. Accordingly, since worker 120 can move on to the next work at a desired timing, the work efficiency can be improved.

Moreover, for example, a projection method according to the present embodiment includes: projecting drawings 110 individually onto a plurality of work spots in work site 100 by projection device 20 including driver 27 that changes an orientation of projection device 20. When drawings 110 are individually projected onto a first work spot and a second work spot in a stated sequence, and the second work spot is outside projection angle 111 that is projectable by projection device 20, the projecting includes changing the orientation of projection device 20 by driver 27 to include the second work spot within projection angle 111 after work at the first work spot is finished. The first work spot and the second work spot are included in the plurality of work spots.

This reduces the burden on worker 120, because worker 120 does not have to change the orientation of projection device 20. Since drawings 110 are projected in sequence, worker 120 only needs to work in accordance with the projected drawing 110 and can skip checking the design drawing. Accordingly, the present embodiment allows worker 120 to work efficiently, and reduce a construction period and burdens on workers.

Moreover, for example, the projection method further includes: generating image for input 130 for inputting a sequence of work at the plurality of work spots based on design data showing the plurality of work spots, and causing display 36 to display a generated image; and receiving input of the sequence of work. The projecting includes projecting drawings 110 individually onto the plurality of work spots in accordance with the sequence of the work that has been received.

With this, drawings 110 are projected in accordance with the sequence input by the user. This allows worker 120 to input, as a sequence of work, a sequence that is easy for them to work, thereby improving the work efficiency.

Moreover, for example, the projection method further includes: receiving an instruction indicating an end of work from worker 120 who performs work at the plurality of work spots. The projecting includes projecting one of drawings 110 onto the second work spot after the instruction indicating the end of the work at the first work spot is received.

With this, since worker 120 can move on to the next work at a desired timing, the work efficiency can be improved.

[Variations]

Next, variations of the embodiment will be described. The following will mainly describe differences between the embodiment and variations, and overlapping description will be omitted or simplified.

[Variation 1] For example, in the embodiment, when projection device 20 projects drawing 110 onto a structure of work site 100, a projection plane of the structure might not be facing the front of projection device 20. Therefore, drawing 110 might not be projected as designed in a design plan.

In view of this, projection device 20 of projection system 10 according to this variation corrects drawing 110 to project drawing 110. Specifically, distance measurer 22 of projection device 20 detects a distance to the projection plane. Based on the distance detected by distance measurer 22, controller 25 corrects the drawing and causes projector 23 to project the corrected drawing 110.

Figure 8:
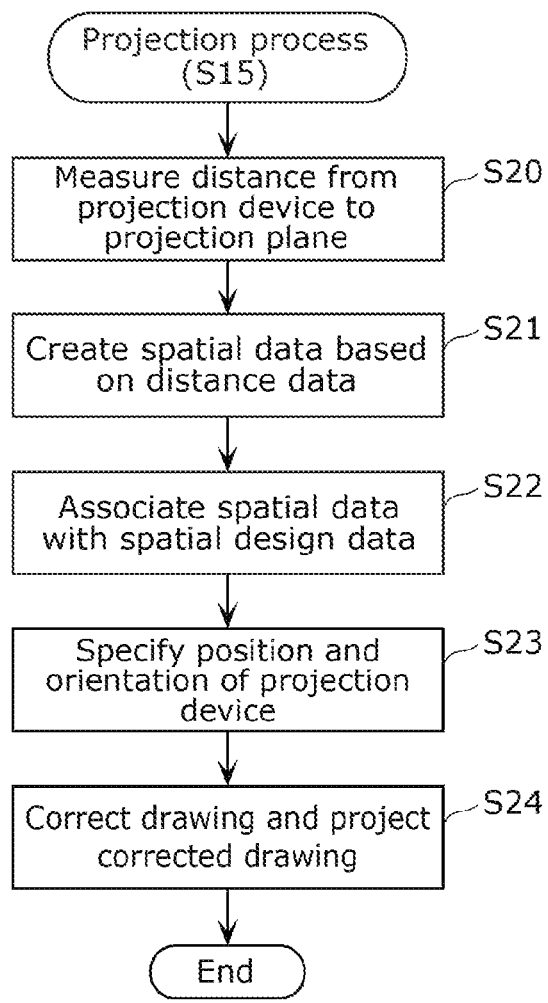
FIG. 8 is a flowchart illustrating an example of a projection process in operations of a projection system according to Variation 1 of the embodiment.

FIG. 8 is a flowchart illustrating an example of a projection process in projection system 10 according to the present variation. Specifically, FIG. 8 illustrates an example of a specific process of step S15 shown in FIG. 4.

As illustrated in FIG. 8, first, controller 25 performs a spatial recognition process. Specifically, controller 25 controls distance measurer 22 to cause distance measurer 22 to measure the distance from projection device 20 to a work spot which is a projection plane (S20). Specifically, controller 25 controls driver 27 to change the orientation of distance measurer 22 to pan and tilt directions, and causes distance measurer 22 to measure the distance to the projection plane. In this way, distances from projection device 20 to walls, a floor, and a ceiling can be measured. Controller 25 then transmits distance data indicating the measured distances to data processing device 30 via communicator 21.

Data processor 32 of data processing device 30 generates spatial data showing an actual measurement result of the shape and size of work site 100, based on the distance data received via communicator 31 (S21). Next, data processing device 30 reads spatial design data showing the designed shape and size of work site 100 included in the design data stored in storage 34, and associates the spatial data with the spatial design data (S22).

Note that association between the spatial data and the spatial design data performed in steps S20 to S22 may be performed at the timing when projection device 20 is placed. The association between the spatial data and the spatial design data performed in steps S20 to S22 need not be performed every time drawing 110 is projected. The association may be performed only once.

Next, data processing device 30 specifies the position and orientation of projection device 20 in work site 100 based on the result of association (S23). Specifically, data processor 32 of data processing device 30 transmits, to projection device 20 via communicator 31, a control signal for projecting a drawing corresponding to a work spot onto the work spot (projection plane). When the control signal is received by projection device 20 via communicator 21, controller 25 of projection device 20 specifies the work point based on the control signal, corrects the target drawing, and projects the corrected target drawing onto the work spot in an actual size (S24). If the projection axis of projector 23 (i.e., the central axis of the projected light, i.e., the optical axis) is not orthogonal to the projection plane, distortion correction is performed based on the angle at which the projection axis intersects the projection plane (specifically, pan and tilt angles, for example).

Figure 9:
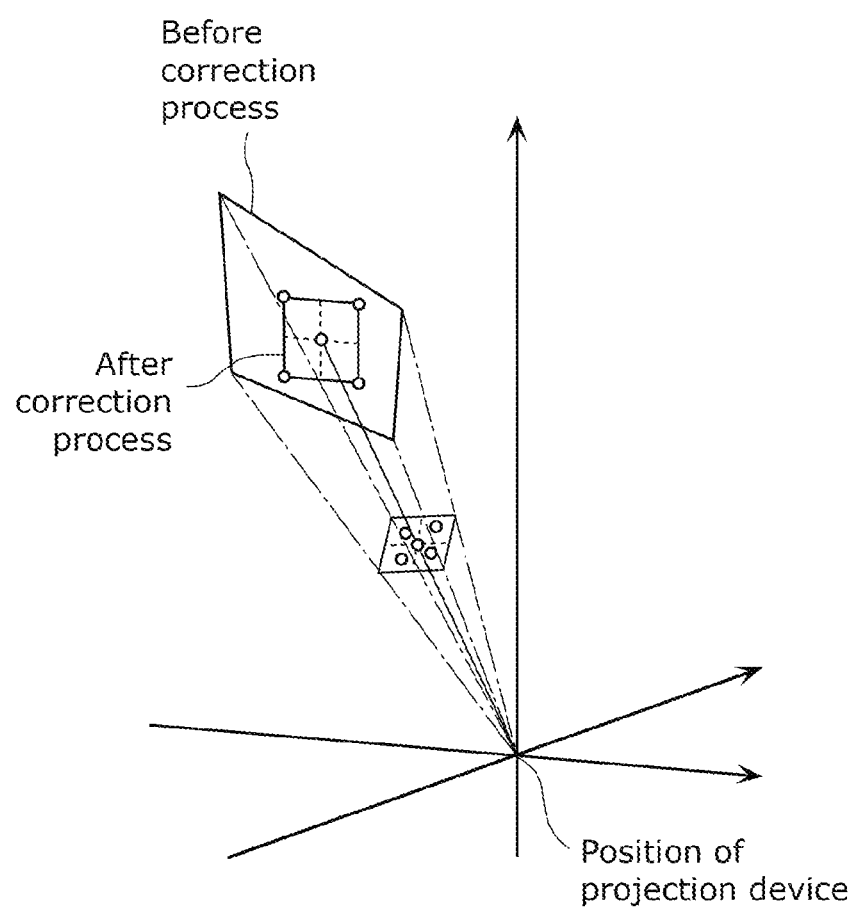
FIG. 9 is a diagram for illustrating a correction process for a drawing to be projected in the projection system according to Variation 1 of the embodiment.

FIG. 9 is a diagram for illustrating a distortion correction process and a projection magnification correction process. Note that the angle at which the projection axis intersects the projection plane is determined by the position of projection device 20 in work site 100 specified in step S15 and inclination of projection device 20 with respect to the projection plane. When the projection plane is a quadrilateral region, the inclination of projection device 20 is calculated based on the distance to each vertex of the quadrilateral region, for example. Alternatively, the inclination of projection device 20 may be calculated based on the amount by which projection device 20 is moved by driver 27 in each of the pan, tilt, and roll directions.

In order to project drawing 110 in an actual size, the projection magnification is corrected. The length of a line of light to the projection plane when scanner 23b (MEMS mirror) performs scan at the same angle varies depending on the distance from projection device 20 to the projection plane. Therefore, controller 25 corrects the projection magnification (i.e., a tilt angle of scanner 23b), for example, based on a distance from projection device 20 to the projection plane, which is included in the distance data measured in step S20.

The distortion correction process and the projection magnification correction process described above makes it possible to project a line of light representing a work spot (for example, a position of marking) at an appropriate location and in an appropriate size (length).

As described above, in projection system 10 according to the present variation, projection device 20 further includes sensing unit 22b that detects a distance to a projection plane. Projection device 20 corrects the drawings based on the distance detected and projects corrected drawings. Moreover, for example, in the projection method according to the present variation, the projecting includes detecting a distance to a projection plane to correct the drawings based on the distance detected, and projecting corrected drawings.

With this, an accurate drawing 110 is displayed onto a work spot. This makes it easier for worker 120 to work according to the projected drawing 110. Therefore, work efficiency can be further improved.

[Variation 2]

Figure 10:
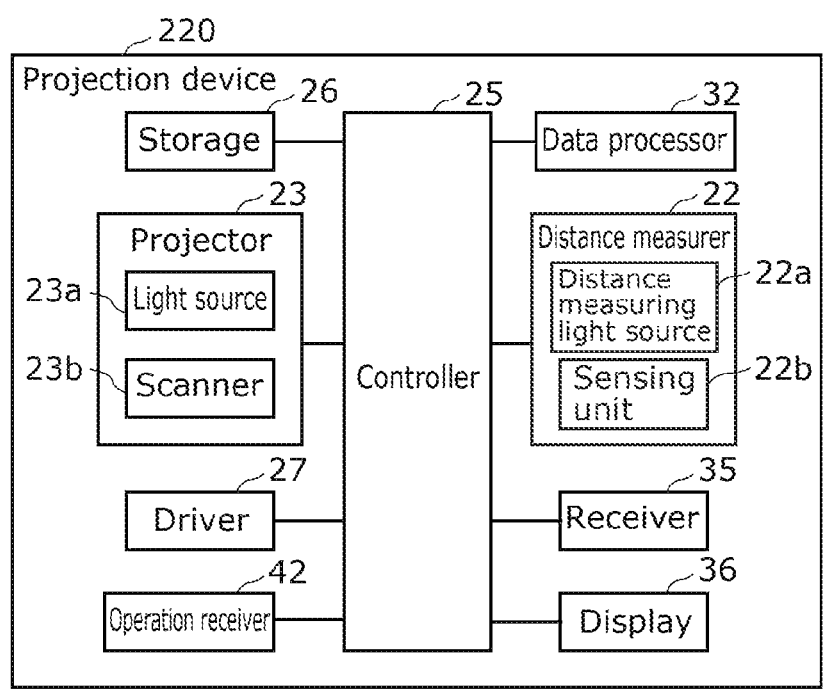
FIG. 10 is a block diagram of a function configuration of a projection device according to Variation 2 of the embodiment.

Furthermore, an example in which projection device 20, data processing device 30, and terminal device 40 are separate devices has been described in the above embodiment, but these devices may be an integrated device, for example. FIG. 10 is a block diagram of a function configuration of projection device 220 according to the present variation.

Projection device 220 illustrated in FIG. 10 additionally includes data processor 32, receiver 35, display 36, and operation receiver 42, compared with projection device 20 according to the embodiment illustrated in FIG. 3. Data processor 32, receiver 35, display 36, and operation receiver 42 each have the same functions as those in the embodiment. Moreover, projection device 220 does not have communicator 21. Storage 26 of projection device 220 stores design data and drawing data.

In this variation, worker 120 does not have terminal device 40. In this case, the end of work will be determined, for example, based on a result captured by sensing unit 22b of distance measurer 22 or a camera. Specifically, capturing images of worker 120 makes it is possible to determine actions of worker 120 and the end of work at a work spot. For example, if worker 120 performs marking and when finishing of marking at a work spot can be detected, this can be considered as having received an instruction indicating the end of the work. With this, projection device 220 can project a drawing onto a next work spot.

As described above, projection device 220 according to the present variation is a projection device that projects drawings 110 individually onto a plurality of work spots in work site 100. Projection device 220 includes driver 27 that changes an orientation of projection device 220. When drawings 110 are individually projected onto a first work spot and a second work spot in a stated sequence, and the second work spot is outside projection angle 111 that is projectable by projection device 220, driver 27 changes the orientation of projection device 220 to include the second work spot within projection angle 111 after work at the first work spot is finished. The first work spot and the second work spot are included in the plurality of work spots.

With this, it is not necessary to perform communication between data processing device 30 and terminal device 40. Only placing projection device 220 allows worker 120 to work efficiently, and reduce a construction period and burdens on workers.

[Others]

The projection system, projection device, and projection method according to one or more aspects of the present invention have been described on the basis of the embodiment and its variations, but the present invention should not be construed to limit to the embodiment.

For example, a sequence of work may be input via terminal device 40. Specifically, display 43 of terminal device 40 may display image for input 130, and a sequence of work may be selected via operation receiver 42.

In addition, the method of communication between the devices described in the above embodiment may be any communication method without limitation. When wireless communication is performed between the devices, the wireless communication system (communication standard) is, for example, Near Field Communication, such as ZigBee (registered trademark), Bluetooth (registered trademark), or a wireless local area network (LAN). Alternatively, the wireless communication system (communication standard) may be communication over Wide Area Network, such as the Internet. In addition, wired communication may be performed between the devices instead of wireless communication. Specifically, wired communication is communication using Power Line Communication (PLC) or wired LAN.

Moreover, in the above embodiment, a process performed by a particular processor may be performed by another processor. Moreover, the sequence of processes may be changed, or processes may be performed in parallel. Moreover, distribution of the structural components included in the projection system to multiple devices is an example. For example, structural components included one device may be included in another device. Moreover, the projection system may also be achieved as a single device.

For example, the processes described in the embodiment may be achieved by centralized processing by a single device (system), or by decentralized processing by multiple devices. Moreover, the processor that executes the above program may be one processor or multiple processors. In other words, centralized processing may be performed, or distributed processing may be performed.

In addition, in the above embodiment, all or part of the structural components, such as the controllers, may include dedicated hardware, or may be achieved by executing an appropriate software program for each structural component. Each structural component may be achieved by a program executor, such as a central processing unit (CPU) or a processor, reading and executing a software program recorded on a recording medium, such as a hard disk drive (HDD) or semiconductor memory.

In addition, the structural components, such as the controllers may include one or more electronic circuits. One or more electronic circuits may be either general-purpose circuits or dedicated circuits.

One or more electronic circuits may include, for example, a semiconductor device, an integrated circuit (IC) or large scale integration (LSI). An IC or LSI may be integrated into a single chip or multiple chips. Due to a difference in the degree of integration, the electronic circuit referred here to as an IC or LSI may be referred to as a system LSI, very large scale integration (VLSI), or ultra large scale integration (ULSI). Furthermore, a field programmable gate array (FPGA) which is programmable after manufacturing of the LSI can be used for the same purposes.

In addition, the general or specific aspects of the present invention may be achieved by a system, a device, a method, an integrated circuit or a computer program. Alternatively, these may be achieved using a non-transitory computer-readable recording medium such as an optical disk, HDD, or semiconductor memory storing the computer program. Furthermore, these may be achieved using any combination of systems, devices, methods, integrated circuits, computer programs, and recording media.

Other than the above, the present invention also includes embodiments as a result of adding various modifications that may be conceived by those skilled in the art to the embodiment, and embodiments obtained by combining structural components and functions in the embodiment in any manner as long as the combination does not depart from the scope of the present invention.

The invention claimed is:

1. A projection system, comprising:
    a projection device that projects drawings individually onto a plurality of work spots in a work site based on design data showing a size and a shape of the work site; and
    a data processor that specifies a placing position and an orientation of the projection device in the design data after the projection device is placed in the work site, wherein:
    the projection device includes:
        a driver that changes the orientation of the projection device; and
        a controller that controls the driver,
    when drawings are individually projected onto a first work spot and a second work spot in a stated sequence, and the second work spot is outside a projection angle that is projectable by the projection device, the controller determines a direction and an amount of movement of the orientation of the projection device to include the second work spot within the projection angle after work at the first work spot is finished, the first work spot and the second work spot being included in the plurality of work spots, and
    the driver changes the orientation of the projection device based on the direction and the amount of movement determined by the controller.

2. The projection system according to claim 1, further comprising:
a display; and
a first receiver, wherein
the data processor generates, based on the design data, an image for inputting a sequence of work at the plurality of work spots, and causes the display to display the image,
the first receiver receives input of the sequence of the work, and
the projection device projects the drawings individually onto the plurality of work spots in accordance with the sequence of the work received by the first receiver.

3. The projection system according to claim 1, wherein the projection device further includes a detector that detects a distance to a projection plane, and the projection device corrects the drawings based on the distance detected and projects corrected drawings.

4. The projection system according to claim 2, wherein the projection device further includes a detector that detects a distance to a projection plane, and the projection device corrects the drawings based on the distance detected and projects corrected drawings.

5. The projection system according to claim 1, further comprising:
a second receiver that receives an instruction indicating an end of work from a worker who performs work at the plurality of work spots, wherein
the projection device projects one of the drawings onto the second work spot after the instruction indicating the end of the work at the first work spot is received by the second receiver.

6. The projection system according to claim 2, further comprising:
a second receiver that receives an instruction indicating an end of work from a worker who performs work at the plurality of work spots, wherein
the projection device projects one of the drawings onto the second work spot after the instruction indicating the end of the work at the first work spot is received by the second receiver.

7. The projection system according to claim 3, further comprising:
a second receiver that receives an instruction indicating an end of work from a worker who performs work at the plurality of work spots, wherein
the projection device projects one of the drawings onto the second work spot after the instruction indicating the end of the work at the first work spot is received by the second receiver.

8. The projection system according to claim 4, further comprising:
a second receiver that receives an instruction indicating an end of work from a worker who performs work at the plurality of work spots, wherein
the projection device projects one of the drawings onto the second work spot after the instruction indicating the end of the work at the first work spot is received by the second receiver.

9. A projection device, comprising:
a projector that projects drawings individually onto a plurality of work spots in a work site based on design data showing a size and a shape of the work site;
a data processor that specifies a placing position and an orientation of the projection device in the design data after the projection device is placed in the work site;
a driver that changes the orientation of the projection device; and
a controller that controls the driver, wherein:
when drawings are individually projected onto a first work spot and a second work spot in a stated sequence, and the second work spot is outside a projection angle that is projectable by the projection device, the controller determines a direction and an amount of movement of the orientation of the projection device to include the second work spot within the projection angle after work at the first work spot is finished, the first work spot and the second work spot being included in the plurality of work spots, and
the driver changes the orientation of the projection device based on the direction and the amount of movement determined by the controller.

10. A projection method, comprising:
specifying a placing position and an orientation of a projection device in design data after the projection device is placed in a work site, the projection device including a driver that changes an orientation of the projection device and a controller that controls the driver, the design data showing a size and a shape of the work site;
projecting drawings individually onto a plurality of work spots in the work site by the projection device, wherein:
when drawings are individually projected onto a first work spot and a second work spot in a stated sequence, and the second work spot is outside a projection angle that is projectable by the projection device, the projecting includes
determining a direction and an amount of movement of the orientation of the projection device by the controller to include the second work spot within the projection angle after work at the first work spot is finished, and
changing by the driver the orientation of the projection device based on the direction and the amount of movement determined by the controller, the first work spot and the second work spot being included in the plurality of work spots.

11. The projection method according to claim 10, further comprising:
generating an image for inputting a sequence of work at the plurality of work spots based on the design data, and causing a display to display a generated image; and
receiving input of the sequence of the work, wherein
the projecting includes projecting the drawings individually onto the plurality of work spots in accordance with the sequence of the work that has been received.

12. The projection method according to claim 10, wherein the projecting includes detecting a distance to a projection plane to correct the drawings based on the distance detected, and projecting corrected drawings.

13. The projection method according to claim 11, wherein the projecting includes detecting a distance to a projection plane to correct the drawings based on the distance detected, and projecting corrected drawings.

14. The projection method according to claim 10, further comprising:
receiving an instruction indicating an end of work from a worker who performs work at the plurality of work spots, wherein
the projecting includes projecting one of the drawings onto the second work spot after the instruction indicating the end of the work at the first work spot is received.

15. The projection method according to claim 11, further comprising:

receiving an instruction indicating an end of work from a worker who performs work at the plurality of work spots, wherein the projecting includes projecting one of the drawings onto the second work spot after the instruction indicating the end of the work at the first work spot is received.

16. The projection method according to claim 12, further comprising:

receiving an instruction indicating an end of work from a worker who performs work at the plurality of work spots, wherein the projecting includes projecting one of the drawings onto the second work spot after the instruction indicating the end of the work at the first work spot is received.

17. The projection method according to claim 13, further comprising:

receiving an instruction indicating an end of work from a worker who performs work at the plurality of work spots, wherein the projecting includes projecting one of the drawings onto the second work spot after the instruction indicating the end of the work at the first work spot is received.

\* \* \* \* \*